May 17, 1960 J. M. HARKER 2,937,240

SELF-LOADING HYDRO-DYNAMIC BEARING

Filed June 18, 1957 2 Sheets-Sheet 1

INVENTOR
JOHN M. HARKER

BY Richard C. Cummins

ATTORNEY

SELF-LOADING HYDRO-DYNAMIC BEARING

Filed June 18, 1957 2 Sheets-Sheet 2

United States Patent Office 2,937,240

Patented May 17, 1960

2,937,240

SELF-LOADING HYDRO-DYNAMIC BEARING

John M. Harker, Santa Clara County, Calif., assignor to International Business Machines Corporation, New York, N.Y., a corporation of New York Application June 18, 1957, Serial No. 666,347

8 Claims. (Cl. 179—100.2)

This invention relates in general to fluid bearings and in particular to a fluid bearing arrangement in which the bearing member is biased toward the bearing surface. The invention has particular application in controlling the spacing of one member with respect to a moving surface such as the spacing of a magnetic transducer with relation to a magnetizable recording surface.

The prior art has previously shown that if a hydro-dynamic bearing is mounted adjacent to a moving surface, it will assume a particular gliding angle depending on the speed of the surface and the fluid employed to obtain the bearing action. It has further been shown, both experimentally and mathematically, that a static pressure is developed between the bearing and the surface which provides a force tending to space the bearing from the surface. When hydro-dynamic bearings are used for magnetic recording applications, a magnetic transducer is usually housed in the bearing member and spaced from the recording surface by the pressure developed between the bearing member and the moving record member which is usually a rotating disc or drum having a magnetizable surface.

In order to maintain the spacing of the transducer substantially independent of the run-out characteristics of the recording surface, prior art arrangements employ an external biasing means which loads the bearing member after the disc or drum has reached its operating speed. While arrangements of this type operate satisfactorily, they must be selectively operated and, hence, suitable means must be provided for controlling the operation of the biasing means in accordance with the speed of the recording surface.

The present invention provides a hydro-dynamic bearing arrangement having a bearing member which is loaded in accordance with the pressure developed between the bearing and the adjacent moving surface. Since this pressure is a function of the speed of the moving surface, no external control means are necessary. The improved fluid bearing arrangement includes a device which is expansible in response to the static pressure between the bearing member and the bearing surface for transmitting a loading or biasing force to the bearing member.

It is therefore an object of the present invention to provide an improved hydro-dynamic bearing arrangement.

Another object of the present invention is to provide a self-loading fluid bearing.

A further object of the present invention is to provide a self-loading fluid bearing arrangement for positioning a transducer adjacent a recording surface.

Other objects of the invention will be pointed out in the following description and claims and illustrated in the accompanying drawings which disclose by way of example the principle of the invention and the best mode which has been contemplated of applying that principle.

Figure 1:
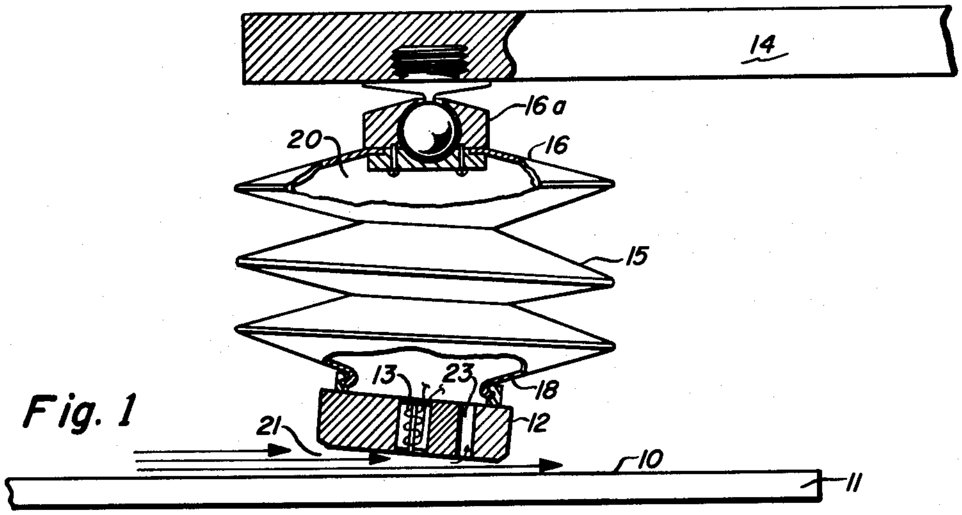
Fig. 1 is an enlarged elevational view, partly in section, illustrating a fluid bearing arrangement embodying the present invention.

Referring to the drawing, the preferred embodiment of the present invention is shown in Fig. 1 which illustrates an application of the improved fluid bearing arrangement in connection with magnetic recording. As shown in Fig. 1, the bearing arrangement comprises a bearing surface 10 which, in this instance, defines a magnetizable surface of a record disc 11, and a fluid bearing member 12 which forms a housing for a magnetic transducer 13. An expansible device responsive to the pressure developed between surface 10 and member 12 is arranged with respect to a support member 14 to apply a loading force to bearing member 12 to bias it towards surface 10. As shown, the expansible device comprises a bellows 15 having one end 16 attached to support member 14 by means of a universal joint 16*a* and the other end 18 attached to bearing member 12. Support member 14 and bellows 15 are preferably arranged so that bearing member 12 is just touching the surface 10 when the recording disc 11 is stationary. The bearing arrangement also includes suitable means for connecting the chamber 20 defined by bellows 15 in fluid exchanging relationship with the static pressure area 21 developed between the bearing member 12 and surface 10. As shown, this means comprises a passage 23 extending through bearing member 12 between the chamber 20 and the bottom of bearing member 12.

The means for moving the record disc to create the fluid flow has been omitted from the drawing in that any suitable means known in the art could be employed. Similarly, since record disc 11 may have a plurality of recording tracks, any suitable means could be employed for moving support member 14 to position the transducer 13 in recording relationship with a particular record track.

Figure 2:
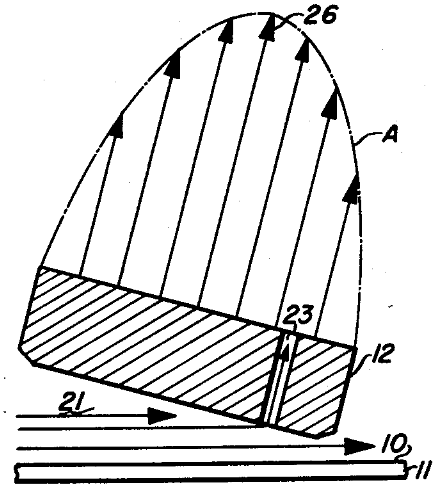
Fig. 2 is a diagrammatic view illustrating the pressure distribution under the bearing member shown in Fig. 1.

In Fig. 2 curve A shows the pressure distribution between the disc 11 and bearing member 12 resulting from the flow of fluid generated by movement of record disc 11. It will be seen from curve A that the highest pressure represented by arrow 26 is in the vicinity of the center of the bearing member 12 and that the pressure decreases toward ambient as the outer edges are approached.

Figure 3:
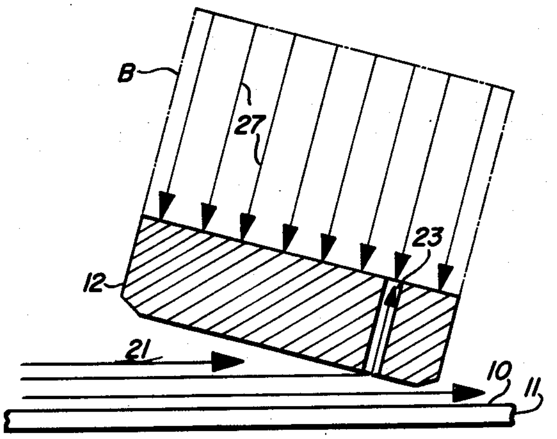
Fig. 3 is a diagrammatic view illustrating the loading force on the bearing member shown in Fig. 1.

Fig. 3 is a view similar to Fig. 2 illustrating the biasing force represented by arrows 27 applied to bearing member 12 by the pressure in bellows 15. The area under curve B in Fig. 3 is equal to the area under curve A in Fig. 2, indicating that a stable condition exists. It should be noted that the location of passage 23 may therefore be varied depending on the loading force desired and the effective area of the bellows.

Figures 4, 5:
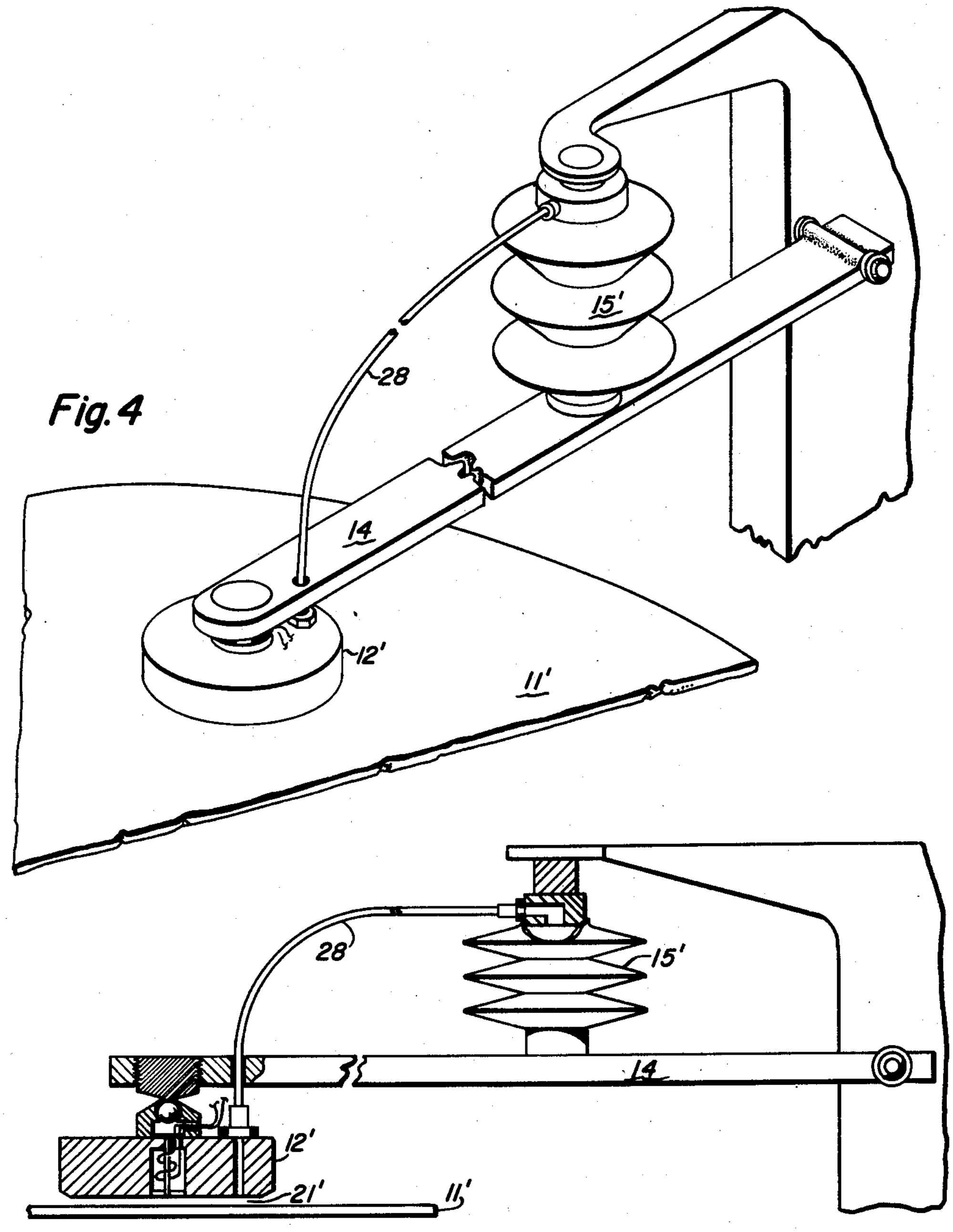
Fig. 4 is a perspective view illustrating a modification of the arrangement shown in Fig. 1.
Fig. 5 is an elevational view, partly in section, of the apparatus shown in Fig. 4.

Figs. 4 and 5 illustrate a modification of the invention shown in Fig. 1. In Figs. 4 and 5 the bearing member 12′ is pivotally mounted to support member 14′ whose vertical position with respect to the record member 11′ is controlled by expansible device 15′. A tubular element 28 connects the inside of the bellows to the pressure area 21′ under the bearing member 12′. A loading force is therefore applied to the bearing member 12′ by the bellows 15′ through the lever action of support member 14′.

It will, of course, be obvious that other types of pressure responsive expansible devices may be employed in the above described bearing arrangement. Similarly, while the preferred embodiment of the invention is illustrated in connection with spacing a magnetic transducer from a moving record member, the invention may be employed wherever it is desired to regulate the spacing of a member with respect to a moving surface.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A hydro-dynamic bearing arrangement comprising in combination a movable bearing surface, a fluid bearing member, support means fixedly spaced from said moving surface, expansible means extending between said support means and said bearing member for positioning said member in sliding relationship to said surface, said bearing member and said surface defining an above-ambient pressure area, and means for connecting the area defined by said expansible means in fluid exchanging relationship with said above ambient pressure area to cause said expansible means to expand to bias said member toward said surface.

2. A hydro-dynamic bearing arrangement comprising in combination a movable bearing surface, support means, a hydro-dynamic bearing member universally mounted on said support means to permit the fluid flow caused by said moving surface to develop a bearing force pressure necessary to space the bearing member from said surface, and expansible means for urging said support means toward said surface to space said member from said surface in accordance with said pressure between said member and said surface resulting from the flow of fluid caused by moving said surface.

3. A hydro-dynamic bearing arrangement comprising in combination a movable bearing surface, a fluid bearing member, a support member, said bearing member and said surface defining an above-ambient pressure area, a bellows extending between the support member and said bearing member for positioning said bearing member in gliding relationship with respect to said surface, and fluid exchange means disposed between the area defined by said bellows and said above ambient pressure area.

4. Apparatus for controlling the spacing of a transducer with respect to a moving magnetizable surface comprising in combination a fluid bearing, said bearing and said surface defining a high pressure area, a transducer mounted in said bearing, support means, a bellows mounted between said support means and said fluid bearing for positioning said transducer in recording relationship with said magnetizable surface, and means connecting the area defined by said bellows with said high pressure area.

5. The apparatus set forth in claim 4 wherein said bellows is universally mounted on said support means.

6. Apparatus for controlling the spacing of a transducer with respect to a moving magnetizable surface comprising in combination said transducer, a fluid bearing for housing said transducer, said bearing and said surface defining a first pressure area, support means movable toward and away from said surface, means for universally mounting said bearing member to said support means, expansible means enclosing a second pressure area and operable to move said support means to load said bearing in response to the pressure in said first area, and means for connecting said areas in fluid exchanging relationship.

7. A hydrodynamic bearing arrangement comprising in combination a movable bearing surface, a fluid bearing member positioned adjacent said movable surface and spaced therefrom in accordance with the pressure and flow of fluid caused by the movement of said surface, expansible means connected to said bearing member, and means for establishing fluid communication between said expansible means and the space between said member and said surface so as to render said expansible means responsive to said pressure developed in said space for transmitting a loading force to said bearing member.

8. Apparatus for controlling the spacing of a transducer with respect to a moving magnetizable surface comprising in combination a fluid bearing, a transducer mounted in said bearing, support means, expansible means disposed between said bearing and said support means, and means for establishing fluid communication between said expansible means and pressure space between said member and said surface so as to render said expansible means responsive to the pressure developed in said space for applying a force between said support means and said bearing to bias said bearing toward said surface.

References Cited in the file of this patent

UNITED STATES PATENTS

| | | |
|---|---|---|
| 1,990,548 | Keller | Feb. 12, 1935 |
| 2,391,896 | Hanson | Jan. 1, 1946 |
| 2,612,566 | Anderston et al. | Sept. 30, 1952 |
| 2,704,540 | Engelder | Mar. 22, 1955 |

FOREIGN PATENTS

| | | |
|---|---|---|
| 688,554 | Great Britain | Mar. 11, 1953 |